United States Patent
Pipher et al.

(10) Patent No.: US 11,252,466 B2
(45) Date of Patent: Feb. 15, 2022

(54) CONTENT SYNCHRONIZATION BETWEEN PROXIMATE DISPLAY DEVICES

(71) Applicant: T-MOBILE USA, INC., Bellevue, WA (US)

(72) Inventors: Nicholas Pipher, Parker, CO (US); Wilfred Tucker, Centennial, CO (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/890,852

(22) Filed: Jun. 2, 2020

(65) Prior Publication Data
US 2021/0377596 A1    Dec. 2, 2021

(51) Int. Cl.
| H04N 21/43 | (2011.01) |
| H04N 21/4363 | (2011.01) |
| H04N 21/4367 | (2011.01) |
| H04N 21/472 | (2011.01) |
| H04N 21/422 | (2011.01) |

(52) U.S. Cl.
CPC ..... *H04N 21/43078* (2020.08); *H04N 21/422* (2013.01); *H04N 21/4367* (2013.01); *H04N 21/43637* (2013.01); *H04N 21/472* (2013.01)

(58) Field of Classification Search
CPC ........... H04N 21/43637; H04N 21/422; H04N 21/4367; H04N 21/472; H04N 21/43078
See application file for complete search history.

(56) References Cited

U.S. PATENT DOCUMENTS

| 6,684,400 | B1 | 1/2004 | Goode et al. |
| 8,200,747 | B2 | 6/2012 | Apostolopoulos et al. |
| 9,384,331 | B2 | 7/2016 | Shirron et al. |
| 9,626,363 | B2 | 4/2017 | Rosenblatt et al. |
| 10,545,641 | B2 | 1/2020 | Das |
| 2006/0030356 | A1* | 2/2006 | Haub ............... H04W 52/0245 455/553.1 |
| 2007/0234048 | A1 | 10/2007 | Ziv |

(Continued)

OTHER PUBLICATIONS

Whitney, L.; "How to Use Apple Handoff"; *PCMag*; https://www.pcmag.com/how-to/how-to-use-apple-handoff; Jan. 28, 2019, p. 1-10.

(Continued)

*Primary Examiner* — John R Schnurr
(74) *Attorney, Agent, or Firm* — Han Santos, PLLC

(57) ABSTRACT

Techniques for handing off media content between proximate display devices are provided. Based on a first media player device currently playing media content from a remote media server receiving a request to hand off the media content to a proximate second media player device, the first media player device may send a handoff token to a second media player device to enable the second media player device to play the media content from the remote media server. The handoff token may include an indication of the media content, an indication of a point within a stream of the media content, and/or credentials associated with the user of the first media player device. The second media player device may send the handoff token to the remote media server, which may send the media content to the second media player device based on verifying the information provided in the handoff token.

20 Claims, 6 Drawing Sheets

(56) References Cited

U.S. PATENT DOCUMENTS

| | | | |
|---|---|---|---|
| 2008/0081558 A1* | 4/2008 | Dunko | G11B 27/002 |
| | | | 455/41.1 |
| 2008/0134256 A1 | 6/2008 | daCosta | |
| 2012/0030632 A1* | 2/2012 | McRae | H04N 21/47214 |
| | | | 715/863 |
| 2012/0082424 A1* | 4/2012 | Hubner | H04N 21/6405 |
| | | | 386/219 |
| 2012/0290657 A1* | 11/2012 | Parks | H04B 5/0062 |
| | | | 709/204 |
| 2014/0006483 A1 | 1/2014 | Garmark et al. | |
| 2014/0105561 A1 | 4/2014 | Chen et al. | |
| 2014/0258268 A1 | 9/2014 | Woods | |
| 2015/0242597 A1 | 8/2015 | Danciu | |
| 2015/0356949 A1* | 12/2015 | Kim | H04W 4/18 |
| | | | 345/173 |
| 2016/0142750 A1 | 5/2016 | Huber et al. | |

OTHER PUBLICATIONS

Ritchie, R.; "Why I Want to See Handoff for iTunes in iOS 10 so Ludicrously Much"; *iMore*; https://www.imore.com/handoff-itunes-ios-10-would-be-ludicrously-great; Mar. 7, 2016, p. 1-7.

U.S. Appl. No. 16/890,831, Notice of Allowance dated Aug. 5, 2021, 22 pages.

U.S. Appl. No. 16/890,831, Office Action dated Apr. 29, 2021, 29 pages.

U.S. Appl. No. 17/184,455, Office Action dated Oct. 15, 2021, 24 pages.

\* cited by examiner

CONTENT SYNCHRONIZATION BETWEEN PROXIMATE DISPLAY DEVICES

FIELD OF THE DISCLOSURE

The present disclosure generally relates to techniques for handing off media content between proximate display devices.

BACKGROUND

It is estimated that there are an average of two TVs and two smartphones per US household. Users are continually searching for and watching media content that interests them on personal devices of all types, including downloadable or streaming media content provided by media content services via the Internet. Millennials in particular watch more video content on their mobile devices then on traditional TVs, even when a TV is readily accessible in the same room. Currently, a user who wishes to watch mobile device content on a larger screen can screen share (or screen mirror) or "cast" mobile device content to his or her TV. However, current screen sharing, screen mirroring, and casting techniques are not user-friendly and only work in specific scenarios. For instance, current casting techniques only allow casting in one direction. That is, a user can use casting techniques to share video from a mobile device to a TV, but cannot use casting techniques in the other direction (from a TV to a mobile device).

SUMMARY

Techniques for transitioning or handing off content that is being played/displayed on a first media player device to a second media player device are provided. For example, a user watching a movie on a TV may wish to continue watching on a mobile device when leaving the room in which the TV is located. Similarly, a user watching a movie on his or her mobile device may wish to switch to watching the movie on his or her TV.

Content applications configured to play the content may be installed on both the first media player device and the second media player device. When a user indicates that he or she wishes to switch from the first media player device to the second media player device, the first media player device may transmit an encryption key, such as a handoff token including the necessary information (e.g., account ID, timestamp, media ID, media locator/frame), to the second media player device, and the second media player device may use the token to authenticate/authorize itself with a media server through a separate network connection (i.e., not through the first media player device). After the media server verifies the user's credentials, the media server may transmit the indication of the content and the current frame to the content application running on the second media player device, which may automatically begin playing the indicated content at the current frame. Advantageously, the transition from the first media player device to the second media player device may appear seamless to the user, because the user does not need to log in to the content application running on the second media player device, locate or select the content, or locate his or her current frame in the content.

The user may indicate that he or she wishes to switch from the first media player device to the second media player device in several different ways. Once the two devices are determined to be in proximity of one another (e.g., based on one device receiving a short-range signal transmitted by the other device), a user may "tap" the devices together to trigger the handoff of the content between the devices. For instance, the devices (or one of the devices) may determine that they have been tapped together based on one of the devices receiving a low-power short-range signal (e.g., a Bluetooth® signal or other nearfield signal) from the other device. In some examples, a user may trigger the handoff of the content between the devices by performing a gesture (e.g., by holding one of the devices and gesturing). For example, an accelerometer of the device being held may detect the gesture being performed by the user. In other examples, once the two devices are determined to be in proximity of one another, one or both of the devices may generate a notification allowing a user to select an option to hand off content between the devices.

For instance, in an example use case, a user may be watching a movie on her TV but may need to take her dog for a walk. The user may grab her mobile device as she gets up from the couch, walk to the TV or set top box (STB), and lightly touch her mobile device to the TV or STB. The user may then see a message on her mobile device asking if she wants to sync her content and may confirm (e.g., by selecting "yes" via a user interface of the mobile device), and the movie may begin playing on the user's mobile device. Accordingly, the user may continue to watch her movie via her mobile device while taking her dog for a walk.

In another example use case, as a user is watching his favorite team play in a critical game on his living room TV, the game enters overtime and it is getting late. The user may decide to head upstairs to watch the game on his bedroom TV, so he may grab his mobile device as he gets up from his recliner and touch it to his TV/STB. A message may pop up on his mobile device asking if he wants to sync his content, and he may select "yes" via a user interface of his mobile device to confirm. Accordingly, the user can watch the game on his mobile device as he locks up and turns off the lights and heads upstairs. When the user gets to his bedroom he may touch the mobile device to his bedroom TV/STB, and consequently see a message on the TV asking if he wants to sync his content to that TV. Accordingly, the user may select "yes" and start watching the game on his bedroom TV.

In still another example use case, a user may be watching a movie while riding a stationary bike at the gym but may not finish the movie before the end of her workout. When the user arrives home, she may start watching again for a brief moment on her mobile device and walk over to the living room TV/STB, where she waves her mobile device in front of the TV/STB. A message may appear asking if she wants to sync her content, and she may confirm by selecting "yes" via a user interface. Accordingly, the user may finish watching her movie on her living room TV.

In one aspect, a method for handing off media content between proximate display devices is provided, the method comprising: receiving, by a first media player device currently playing a particular frame of a particular media content from a remote media server, an indication of a request to hand off the particular media content to a second media player device not currently playing the particular media content; and sending, by the first media player device, a handoff token to the second media player device to enable the second media player device to play the particular media content from the remote media server. The handoff token may include one or more of: an indication of the particular media content, an indication of a first point within a stream of the particular media content, and/or one or more credentials associated with a user of the first media player device.

In another aspect, a method for handing off media content between proximate display devices is provided, the method comprising: receiving, from a first media player device currently playing a particular media content from a remote media server, by a second media player device not currently playing the particular media content, a handoff token to enable the second media player device to play the particular media content from the remote media server; sending, from the second media player device to the remote media server, at least one of the indication of the particular media content or the one or more credentials associated with the user of the first media player device; receiving, at the second media player device from the remote media server, an indication of an authorization of the second media player device to play the particular media content; and playing, by the second media player device from the remote media server, the particular media content starting from a second point within the stream of the particular media content based upon the indication of the first point within the stream. The handoff token may include one or more of: an indication of the particular media content, an indication of a first point within a stream of the particular media content, and/or one or more credentials associated with a user of the first media player device.

In still another aspect, a system for handing off media content between proximate display devices is provided, the system comprising: a first media player device configured to play media content; a second media player device configured to play media content; and a remote media server, the remote media server comprising: one or more processors; and a non-transitory program memory communicatively coupled to the one or more processors and storing executable instructions that, when executed by the one or more processors, cause the processors to: send a particular media content to the first media player device; receive, from the second media player device, a handoff token including one or more of: an indication of the particular media content or one or more credentials associated with a user of the first media player device; verify one or more of: (i) the one or more credentials associated with the user of the first media player device, (ii) that the user of the first media player device is authorized to access the particular media content, or (iii) that the second media player device is authorized to access the particular media content; and responsive to the verifying, send one or more of: (i) an authorization to play the particular media content or (ii) the particular media content to the second media player device.

In another aspect, a method for handing off media content between proximate display devices is provided, the method comprising: determining, by one or more of a first media player device currently playing a particular media content from a remote media server and a second media player device, that the first media player device is within a threshold proximity of the second media player device; receiving, by the first media player device, an indication of a request to hand off the particular media content from the first media player device to the second media player device; and sending, by the first media player device, responsive to the determination that the first media player device is within the threshold proximity of the second media player device and receiving the indication of the request, a handoff token to the second media player device to enable the second media player device to play the particular media content from the remote media server.

In still another aspect, a system for handing off media content between proximate display devices is provided, the system comprising: a remote media server; a first media player device configured to play media content; and a second media player device configured to play media content; wherein the first media player device comprises: one or more processors; and a non-transitory program memory communicatively coupled to the one or more processors and storing executable instructions that, when executed by the one or more processors, cause the processors to: determine that the first media player device is within a threshold proximity of the second media player device; receive an indication of a request to hand off the particular media content from the first media player device to the second media player device; and send, responsive to the determination that the first media player device is within the threshold proximity of the second media player device and receiving the indication of the request, a handoff token to the second media player device to enable the second media player device to play the particular media content from the remote media server.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
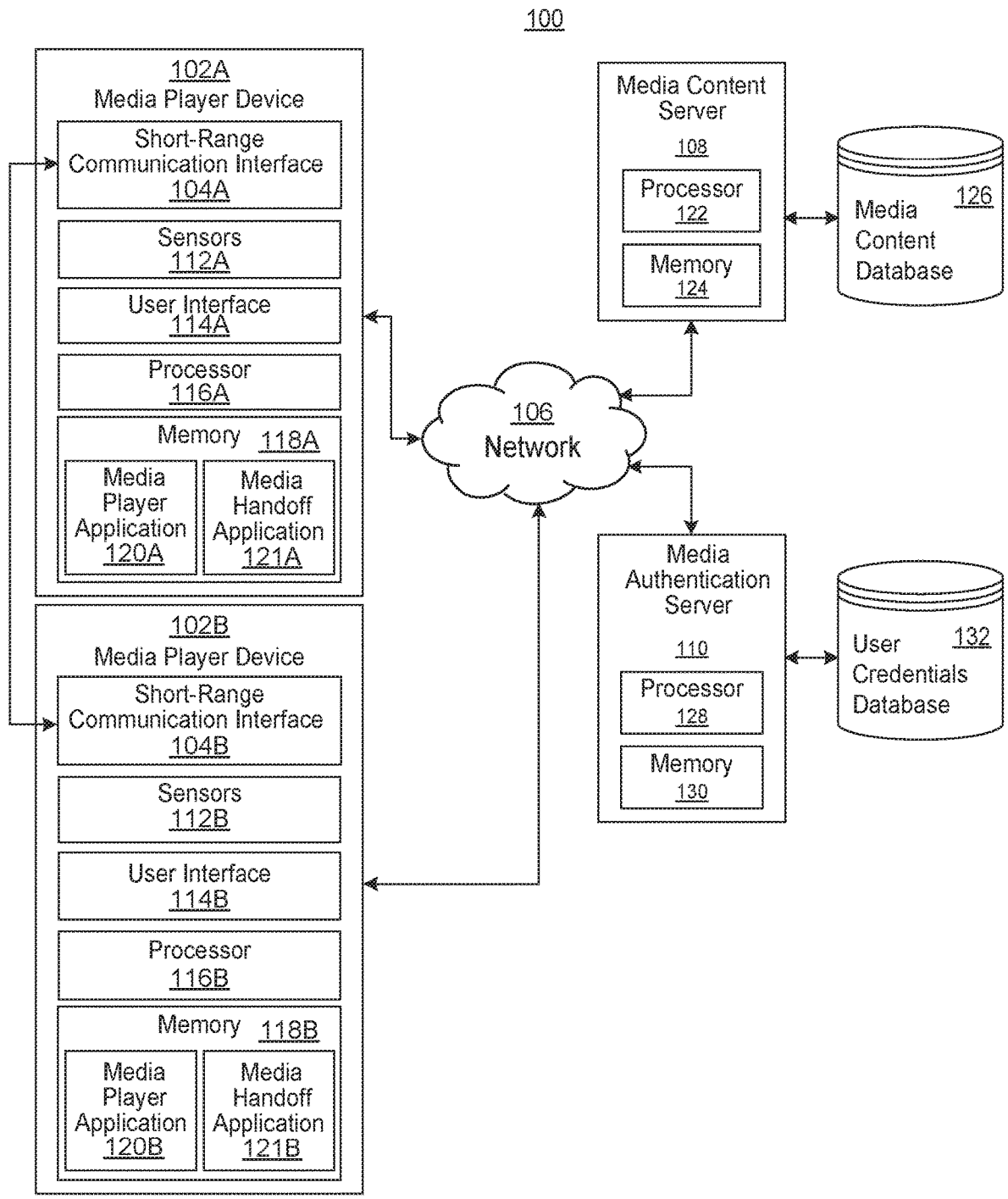
FIG. 1 illustrates a block diagram of an example system for handing off media content between proximate display devices, in accordance with some embodiments.

FIG. 1 illustrates a block diagram of an example system 100 for handing off media content between proximate display devices, in accordance with some embodiments. The high-level architecture illustrated in FIG. 1 may include both hardware and software applications, as well as various data communications channels for communicating data between the various hardware and software components, as is described below.

The system 100 may include two or more media player devices 102A, 102B configured to communicate with one another, e.g., via short-range communication interfaces 104A, 104B and/or via a network 106. The media player devices 102A, 102B may be further configured to communicate with a media content server 108 and/or media authentication server 110 via the network 106.

The media player devices 102A, 102B may both be the same kind of devices or may be different kinds of devices, including, for example, TVs and/or set top boxes associated with TVs, game consoles, mobile computing devices such as smart phone or tablets, smart watches, head-mounted displays (HMD), digital assistant devices, smart appliances, and/or other devices suitable for playing media content, etc. As discussed above, each media player device 102A, 102B may include a respective short-range communication interface 104A, 104B. Additionally, each media player device 102A, 102B may include respective sensors 112A, 112B, and/or a respective user interface 114A, 114B. Furthermore, each media player device 102A, 102B may include one or more respective processors 116A, 116B and a respective memory 118A, 118B (e.g., volatile memory, non-volatile memory) accessible by one or more processors 116A, 116B (e.g., via a memory controller).

The short-range communication interfaces 104A, 104B may include transmitters, receivers, transceivers, etc., and may be configured to send and/or receive short-range wireless communication signals (e.g., Bluetooth® signals, Zigbee® signals, infrared signals, etc.) from one another when the two media player devices 102A, 102B are within a threshold proximity of one another (e.g., 10 feet, 15 feet, 20 feet, etc.). In some examples, the threshold proximity may be set by a user, e.g., based on known locations of the user's typical media player devices. For instance, a user who typically watches television from a TV that is mounted high on a wall may set a higher threshold proximity than a user who typically watches television from a TV that is placed or mounted on a smaller stand. In some examples, a short-range communication interface 104A of one media player device 102A may be configured to selectively reduce its power in some instances in order to transmit a low-power short-range signal that is only receivable by a short-range communication interface 104B of another media player device 102B when the two devices are touching one another or are otherwise within a very short range of one another (e.g., 1 inch, 5 inches, etc.).

The sensors 112A, 112B may include motion sensors such as gyroscopes and/or accelerometers configured to detect motions of the respective media player devices 102A, 102B. In some embodiments, the sensors 112A, 112B may additionally or alternatively include other input sensors, such as microphones digital imaging devices (e.g., digital cameras). In further embodiments, the media player devices 102A, 102B may additionally include input components (not shown) corresponding to one or more sensors 112A, 112B, such as illumination components or speakers.

The user interfaces 114A, 114B may be configured to display content being played by the respective media player devices 102A, 102B. Additionally, in some examples, the user interfaces 114A, 114B may be configured to present information, such as various alerts or notifications, to users of the respective media player devices 102A, 102B. Furthermore, in some examples, the user interfaces 114A, 114B may be configured to receive inputs and/or selections from users of the respective media player devices 102A, 102B.

The one or more respective processors 116A, 116B may interact with each respective memory 118A, 118B to obtain, for example, computer-readable instructions stored in the memory 118A, 118B. The computer-readable instructions stored in the memories 118A, 118B may cause the one or more respective processors 116A, 116B to execute respective media player applications 120A, 120B and/or media handoff applications 121A, 121B. For example, the media player applications 120A, 120B may be configured to play media content sent to the media player devices 102A, 102B by the media content server 108, e.g., via their respective user interfaces 114A, 114B. In some embodiments, the media player application 120A, 120B may further be configured to request media from the media content server 108 or provide device authentication or authorization information to the media authentication server 110 in order to obtain the media content.

Moreover, the media handoff applications 121A, 121B may be configured to detect when other media player devices 102A, 102B are within a threshold proximity, e.g., based on instances in which their respective short-range communication interfaces 104A, 104B detect short-range signals from one another. Furthermore, the media handoff applications 121A, 121B may be configured to send and/or receive requests to hand off content between the media player devices 102A, 102B. For instance, in some examples, a media handoff application 121A of a first media player device 102A may receive an indication of a request to hand off content from the first media player device 102A to the second media player device 102B from a user of the first media player device 102A. For example, the user of the first media player device 102A may request the handoff of content by performing a gesture with the first media player device 102A (e.g., waving the first media player device, moving the first media player device in a circular motion, performing a flick motion with the first media player device in the direction of the second media player device, shaking the first media player device once or a particular number of times, etc.), which may be detected by the sensors 112A. As another example, the user of the first media player device 102A may request the handoff of content by tapping the first media player device 102A to the second media player device 102B, which may be detected based on the short-range communication interface 104A of the first media player device 102A receiving a low-power short-range signal from the second media player device 102B. As still another example, the user of the first media player device 102A may request the handoff of content via the user interface 114A of the first media player device.

Moreover, in some examples, a user of the second media player device 102B may request that the first media player device 102A handoff content to the second media player device 102B, and the second media player device 102B may send an indication of the request to the first media player device 102A, and the media handoff application 121A of the first media player device 102A may receive the indication of the request. For instance, the user of the second media player device 102B may request the handoff in any of the ways discussed above with respect to the user of the first media player device 102A requesting handoff.

Additionally, the media handoff applications 121A, 121B may be configured to send and/or receive handoff tokens between the media player devices 102A, 102B, etc. For instance, based on receiving an indication of a request for a handoff of content from the first media player device 102A to a second media player device 102B within a threshold proximity of the first media player device 102A, the media handoff application 121A of the first media player device 102A may send a handoff token to the second media player device 102B, enabling the second media player device 102B to play the particular media content being played by the first media player device at the time of the request. For instance, the handoff token may include, e.g., an indication of the particular media content (e.g., an indication of which movie, television show, video, game, audio file, etc. is currently being played by the first media player device 102A), an indication of a point within a stream of the particular media content (e.g., 1 minute and 30 seconds into the stream of the particular media content, frame 115 out of 500 of the particular media content, etc.), credentials associated with the user of the first media player device (e.g., username, account number, or other identifying information associated with the user of the first media player device, passwords associated with the username or account number, etc.), etc.

The media handoff application 121B of the second media player device 102B may in turn send the handoff token or information from the handoff token to the media authentication server 110, which may authorize content to be sent to the second media player device 102B by the media content server 108. For instance, in some examples, the media handoff application 121B may send the indication of the particular media content being played by the first media player device 102A and the credentials associated with the user of the first media player device 102A from the handoff token to the media authentication server 110. Moreover, in some examples, the media handoff application 121B may additionally send credentials or other information associated with the second media player device 102B and/or the user of the second media player device 102B to the media authentication server 110. Upon the authorization of the various information from the second media player device 102B by the media authentication server 110, the media content server may send the particular content to the second media player device 102B. For instance, the media authentication server 110 may send an indication of the authorization to the media content server 108, which may in turn send the particular content to the second media player device 102B.

Furthermore, the computer-readable instructions stored on the memory 118A, 118B may include instructions for carrying out any of the steps of the methods 300, 400, 500, and/or 600, described in greater detail below with respect to FIGS. 3, 4, 5, and 6, respectively.

The media content server 108 may include one or more processors 122 and a memory 124 (e.g., volatile memory, non-volatile memory) accessible by one or more processors 122 (e.g., via a memory controller). The one or more processors 122 may interact with each memory 124 to obtain, for example, computer-readable instructions stored in the memory 124. The computer-readable instructions stored in the memory 124 may cause the one or more processors 122 to access media content stored on the memory 124 and/or media content stored in a media content database 126 and send the media content to the media player devices 102A, 102B. In particular, the computer-readable instructions stored on the memory 124 may include instructions for carrying out any of the steps of methods 300, 400, 500, and/or 600, described in greater detail below with respect to FIGS. 3, 4, 5, and 6, respectively. The media content database 126 may be accessed by or incorporated within the media content server 108, in various embodiments.

The media authentication server 110 may include one or more processors 128 and a memory 130 (e.g., volatile memory, non-volatile memory) accessible by one or more processors 128 (e.g., via a memory controller). The one or more processors 128 may interact with each memory 130 to obtain, for example, computer-readable instructions stored in the memory 130. The computer-readable instructions stored in the memory 130 may cause the one or more processors 128 to access user credential information or other authentication information stored on the memory 130 and/or in a user credential database 132 and authenticate requests for content from the media player devices 102A, 102B. In particular, the computer-readable instructions stored on the memory 130 may include instructions for carrying out any of the steps of the methods 300, 400, 500, and/or 600, described in greater detail below with respect to FIGS. 3, 4, 5, and 6, respectively. The user credentials database 132 may be accessed by or incorporated within the media authentication server 110, in various embodiments.

In some examples, the functionality described herein as being performed separately by the media content server 108 and the media authentication server 110 may be performed by one remote media server (not shown).

Figure 2:
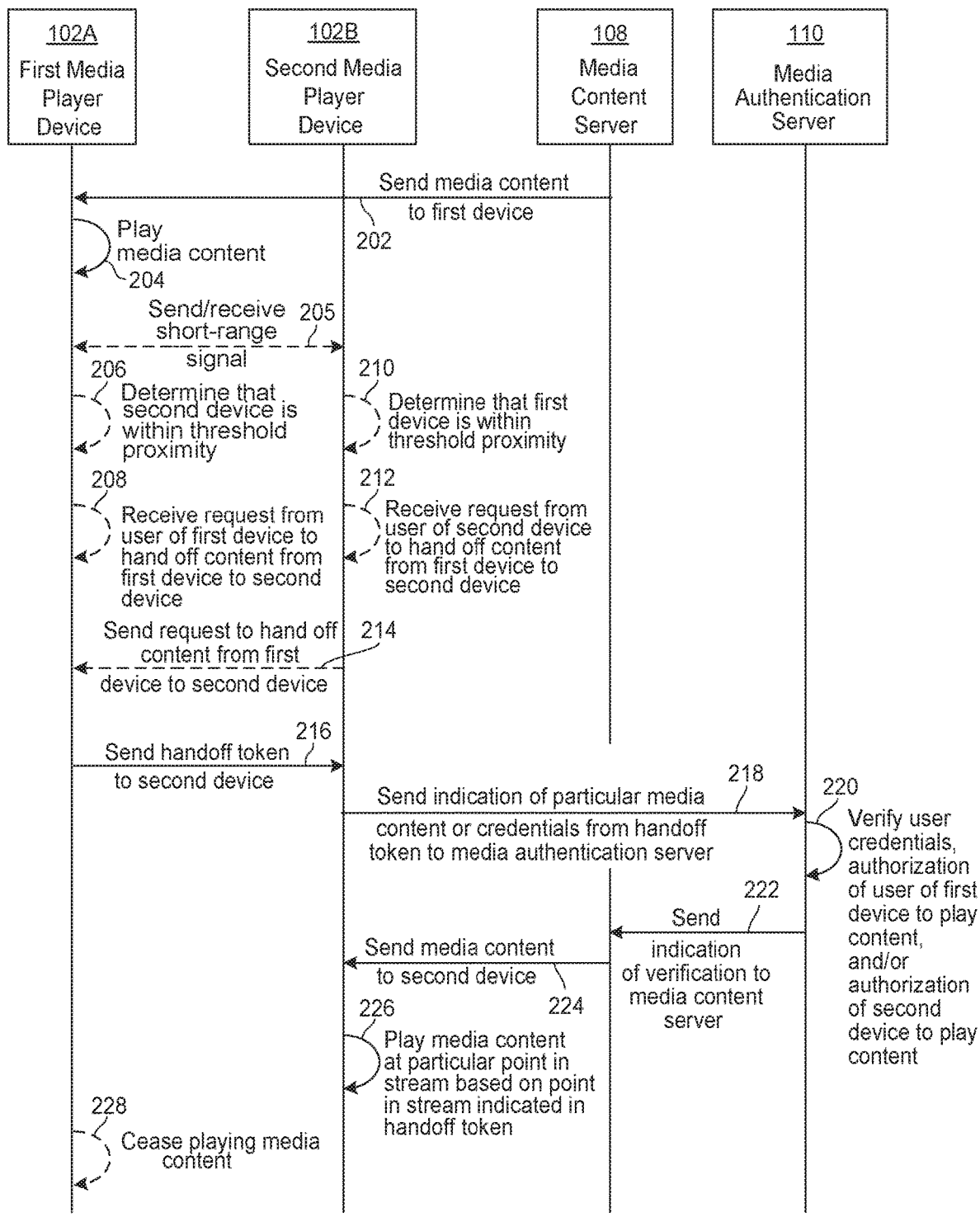
FIG. 2 illustrates a signal diagram associated with an exemplary communication process for handing off media content between proximate display devices, in accordance with some embodiments.

FIG. 2 illustrates a signal diagram associated with an exemplary communication process 200 for handing off media content between proximate display devices, in accordance with some embodiments. The communication process 200 includes communication between a first media player device 102A, a second media player device 102б, a media content server 108, and a media authentication server 110, which are communicatively connected by the short-range communication interfaces 104A, 104б and/or the network 106, as described above with respect to FIG. 1. In some embodiments, the first media player device 102A may be in close proximity to the second media player device 102б, which may be a precondition or requirement for content handoff. In other embodiments, the first media player device 102A may be located remotely from the second media player device 102б (i.e., the devices may not be in close proximity), in which case communication between the first media player device 102A and the second media player device 102б may occur via the network 106 (e.g., through direct or intermediated communication, such as e-mail or short message service (SMS) communication).

The communication process 200 may begin when the media content server 108 sends (line 202) media content, such as an interactive game, an audio file, a movie, a TV show, or other video content, etc., to the first media player device 102A, e.g., in response to a request from the first media player device 102A. The first media player device 102A may play (line 204) the media content from the media content server 108.

In some examples, the first media player device 102A may send (line 205) a short-range wireless signal, and the second media player device 102б may receive (line 205) the short-range wireless signal. In other examples, the second media player device 102б may send (line 205) a short-range wireless signal, and the first media player device 102A may receive (line 205) the short-range wireless signal. In still other examples, both the first media player device 102A and the second media player device 102б may both send and receive short-range wireless signals to and from one another.

For instance, in some examples, the first media player device 102A may determine (line 206) that the second media player device 102B is within a threshold proximity (e.g., within a threshold number of inches, within a threshold number of feet, within the same room, etc.) of the first media player device 102A (e.g., based on receiving the short-range wireless signal from the second media player device 102B). In some examples, the first media player device 102A may further receive (line 208) a request from a user of the first media player device 102A to hand off content from the first media player device 102A to the second media player device 102B.

Moreover, in some examples, the second media player device 102B may determine (line 210) that the first media player device 102A is within a threshold proximity (e.g., within a threshold number of inches, within a threshold number of feet, within the same room, etc.) of the second media player device 102B (e.g., based on receiving the short-range wireless signal from the first media player device 102A). The second media player device 102B may further receive (line 212) a request from a user of the second media player device 102B to hand off content from the first media player device 102A to the second media player device 102B. Furthermore, in some examples, in response to the first media player device 102A being within the threshold proximity of the second media player device 102B and the second media player device 102B receiving the request from the user, the second media player device 102B may send (block 214), to the first media player device 102A, a request to hand off content from the first media player device 102A to the second media player device 102B.

In any case, in response to the request (e.g., the request at line 208, or the request at line 214) to hand off content from the first media player device 102A to the second media player device 102B, and the determined proximity of the two devices within the threshold proximity, the first media player device 102A may send (line 216) a handoff token to the second media player device 102B. For instance, in some examples, the first media player device 102A may send the handoff token via a short-range signal. The handoff token may include an indication of the particular media content being played by the first media player device 102A at line 204 and an indication of a current point within the stream of the particular media content, as well as one or more credentials associated with a user of the first media player device 102A.

The second media player device 102B may send (line 218) an indication of the particular media content and/or the one or more credentials associated with the user of the first media player device 102A from the handoff token to the media authentication server 110. The media authentication server 110 may verify (line 220) one or more of: the credentials associated with the user of the first media player device 102A, the authorization of the user of the first media player device 102A to play the particular content, and/or the authorization of the second media player device 102B to play the particular content, and may send (line 222) an indication of the verification to the media content server 108. In some embodiments, the media authentication server 110 may also determine whether the first media player device 102A should continue receiving the media content after handing off the media content to the second media player device 102B, which may be based upon user account parameters or the information received from the second media player device 102B.

The media content server 108 may in turn send (line 224) the particular media content to the second media player device 102B, and the second media player device 102B may play (line 226) the particular media content. In particular, the second media player device 102B may play the particular media content from the point in the stream indicated in the handoff token from the first media player device 102A, or at a different point in the stream, e.g., a point in the stream determined based on time elapsed since the handoff token was sent at line 216 and when the second media player device 102B begins playing the content.

In some examples, the first media player device 102A may cease (line 228) playing the particular media content once the second media player device 102B begins playing the content. In other examples, the first media player device 102A may continue playing the particular media content until, e.g., the content ends, the first media player device 102A is turned off, a user exits or quits an application playing the content, etc.

In some examples, the communication process 200 may proceed or repeat with roles of the first media player device 102A and second media player device 102B reversed, e.g., with a request to hand off media content from the second media player device 102B to the first media player device 102A.

Figure 3:
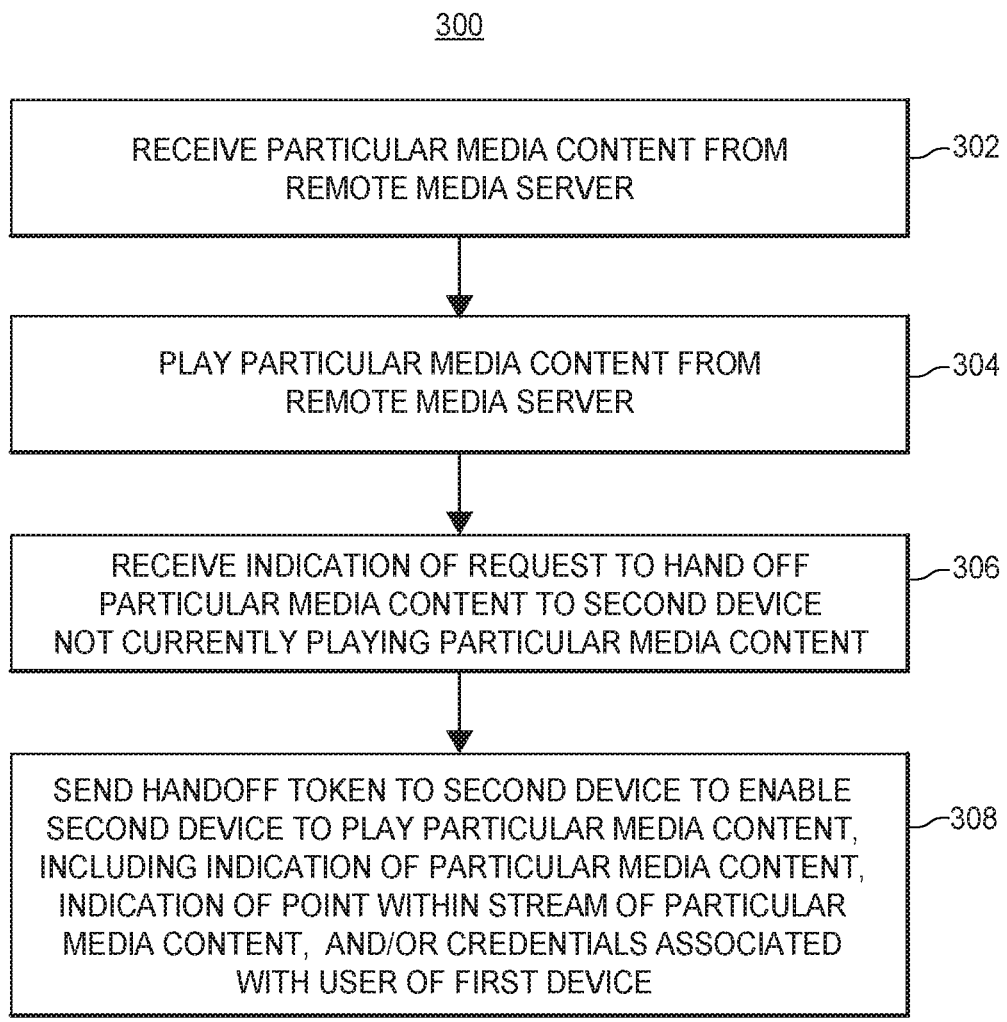
FIG. 3 illustrates a flow diagram of an example method for a display device currently playing particular media content to hand off the media content to a proximate display device not currently playing the particular media content, in accordance with some embodiments.

FIG. 3 illustrates a flow diagram of an example method 300 for a display device currently playing particular media content to hand off the media content to a proximate display device not currently playing the particular media content, in accordance with some embodiments. One or more steps of the method 300 may be implemented as a set of instructions stored on a computer-readable memory 118A, 118B, 124, and/or 130 and executable on one or more processors 116A, 116B, 122, and/or 128.

At block 302, a first media player device (e.g., media player device 102A) may receive particular media content from a remote media server (e.g., the media content server 108), e.g., in response to requesting the particular media content from the remote media server. In some examples, the remote media server may send the particular content in response to receiving an indication of authentication of the first media player device (e.g., a verification of the user based on a passcode, fingerprint, facial recognition identity, etc., associated with the user). At block 304, the first media player device may play the particular media content received from the remote media server.

At block 306, the first media player device may receive an indication of a request to hand off the particular media content to a second media player device (e.g., media player device 102B) that is not currently playing the particular media content. For instance, in some examples, the request may originate from a user of the first media player device. Moreover, in some examples, the request may originate from a second media player device (and/or from a user of the second media player device).

At block 308, the first media player device may send a handoff token to the second media player device to enable the second media player device to play the particular media content. For instance, the handoff token may include, e.g., an indication of the particular media content, an indication of a point within a stream of the particular media content, and/or one or more credentials associated with a user of the first media player device. For instance, the point within the stream of the particular media content may be a frame of the particular media content —e.g., a video or audio frame, or another suitable indicator of a location within the media content being played by the first media player device at the time of the request and/or at the time of the handoff, such as a time elapsed since the first media player device began playing the media content at the time of the request and/or the time of the handoff.

Moreover, in some examples, the handoff token may further include a time stamp associated with the time that the first media player device receives the indication of the request to hand off the first media content to the second media player device. Moreover, in some examples, the handoff token may include a time stamp associated with the time that the first media player device sends the handoff token to the second media player device.

In some examples, the method 300 may include the first media player device ceasing to play the particular media content upon sending the handoff token to the second media player device. In some examples, the first media player device may cease to play the particular media content after a certain amount of time elapses after sending the handoff token to the second media player device, such as within one second of sending the handoff token to the second media player device, within five seconds of sending the handoff token to the second media player device, etc. Moreover, in some examples, the first media player device may cease to play the particular media content after receiving an indication that the second media player device has begun to play the particular media content. Such cessation may be automatically controlled by the remote media server in some embodiments, e.g., by terminating a media content stream to the first media player device.

Figure 4:
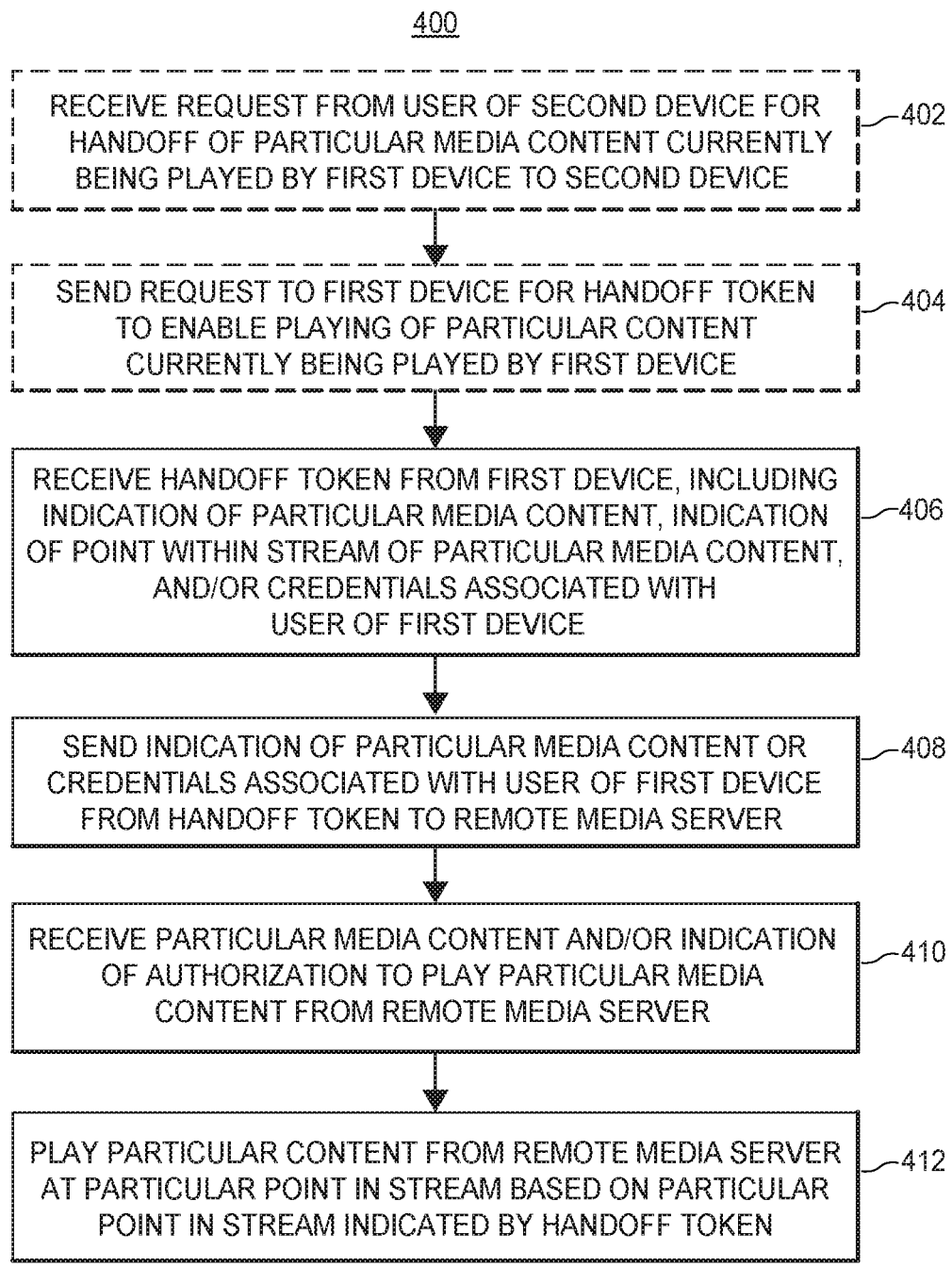
FIG. 4 illustrates a flow diagram of an example method for a display device to be handed off particular media content from a proximate display device currently playing the particular media content, in accordance with some embodiments.

FIG. 4 illustrates a flow diagram of an example method 400 for a display device to be handed off particular media content from a proximate display device currently playing the particular media content, in accordance with some embodiments. One or more steps of the method 400 may be implemented as a set of instructions stored on a computer-readable memory 118A, 118B, 124, and/or 130 and executable on one or more processors 116A, 116B, 122, and/or 128.

At block 402, while a first media player device (e.g., the media player device 102A) plays particular media content from a remote media server (e.g., the media content server 108), a second media player device (e.g., the media player device 102B) may optionally receive a request from a user of the second media player device for a handoff of the particular media content from the first media player device to the second media player device.

At block 404, responsive to receiving the request from the user of the second media player device, the second media player device may optionally send a request to the first media player device for a handoff token to enable the second media player device to play the particular media content being played by the first media player device at the time of the request.

In other examples, the first media player device may receive a request from the user of the first media player device to hand off the particular media content being played by the first media player device to the second media player device.

In any case, at block 406, the second media player device may receive a handoff token from the first media player device. For instance, the handoff token may include, e.g., an indication of the particular media content, an indication of a point within a stream of the particular media content, and/or one or more credentials associated with a user of the first media player device. For instance, the point within the stream of the particular media content may be a frame of the particular media content—e.g., a video or audio frame, or another suitable indicator of a location within the media content being played by the first media player device at the time of the request and/or at the time of the handoff, such as a time elapsed since the first media player device began playing the media content at the time of the request and/or the time of the handoff.

Moreover, in some examples, the handoff token may further include a time stamp associated with the time that the first media player device receives the indication of the request to hand off the first media content to the second media player device. Furthermore, in some examples, the handoff token may include a time stamp associated with the time that the first media player device sends the handoff token to the second media player device. Additionally, the handoff token may include a time stamp associated with the time that the second media player device receives the handoff token.

At block 408, the second media player device may send the indication of the particular media content and/or the credentials associated with the user of the first media player device from the handoff token to a remote media server (e.g., the media authentication server 110). Because the remote media server controls media content access, it is not necessary that the second media player device be able to access or decrypt the credentials received from the first media player device, thus permitting sharing of the particular media content without security risk to an account associated with the first media player device.

At block 410, the second media player device may receive an indication of an authorization to play the particular media content from a remote media server (e.g., the media authentication server 110), and/or may receive the particular media content from a remote media server (e.g., the media content server 108). In some examples, such indication of authorization may include a notification of a successful handoff, playback parameters, a link to the content, or the beginning of the particular content to be played.

At block 412, the second media player device may play the particular content from the remote media server. In some examples, the second media player device may play the particular content starting from the point within the stream of the particular media content indicated in the handoff token. Moreover, in some examples, the second media player device may play the particular media content starting from a point based on the point within the stream of the particular media content indicated in the handoff token. For instance, the second media player device may start playing the particular media content at a point within the stream of the particular media content after the point indicated in the handoff token, e.g., after the point indicated in the handoff token by an amount of time based on the time elapsed since the request was received, or on a time elapsed since the handoff. In some instances, determining the point within the stream of the particular media content at which the second media player device should begin playing may be adjusted based on varying frame rates of the first and second media player devices.

Figure 5:
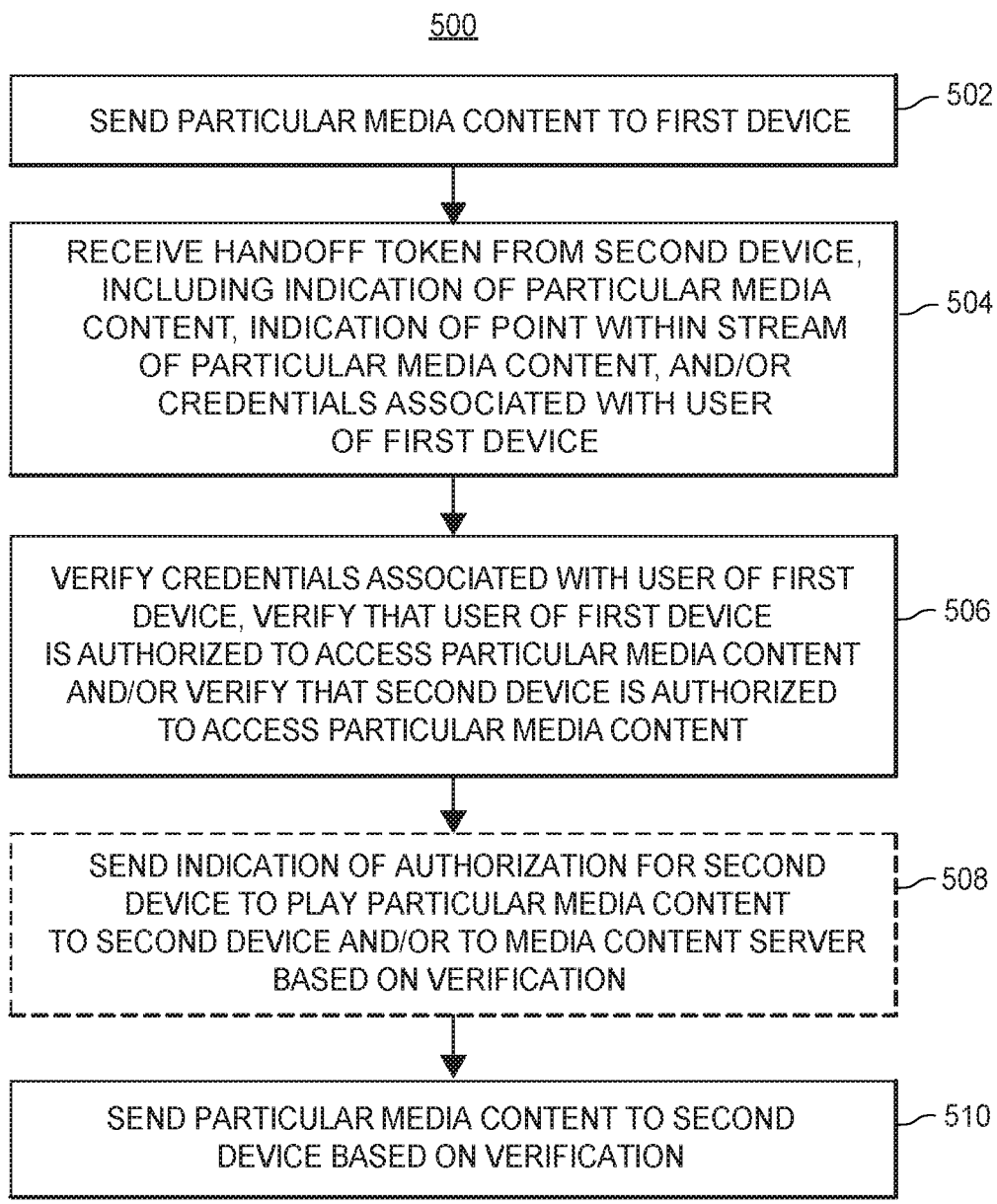
FIG. 5 illustrates a flow diagram of an example method of authenticating media content handoff between two proximate display devices, in accordance with some embodiments.

FIG. 5 illustrates a flow diagram of an example method 500 of authenticating media content handoff between two proximate display devices, in accordance with some embodiments. One or more steps of the method 500 may be implemented as a set of instructions stored on a computer-readable memory 118A, 118B, 124, and/or 130 and executable on one or more processors 116A, 116B, 122, and/or 128.

At block 502, one or more remote media servers (e.g., media content server 108 and/or media authentication server 110), may send particular media content to a first media player device (e.g., media player device 102A). In some examples, the remote media server may send the particular media content to the first media player device based on a request received from the first media player device.

At block 504, the one or more remote media servers may receive a handoff token (or information from a handoff token) from a second media player device (e.g., media player device 102B). For instance, the second media player device may receive the handoff token from the first media player device. For instance, the handoff token may include, e.g., an indication of the particular media content, an indication of a point within a stream of the particular media content, and/or credentials associated with a user of the first media player device. In some examples, the remote media server may receive the indication of the particular media content and/or the credentials associated with the user of the first media player device from the second media player device. Moreover, in some examples, the remote media server may further receive information associated with the second media player device and/or information associated with a user of the second media player device from the second media player device.

At block 506, the one or more remote media servers may verify the credentials associated with the user of the first media player device, as received from the second media player device. In some examples, a remote media server may additionally or alternatively verify that the user of the first media player device was authorized to play the particular media content. Moreover, in some examples, a remote media server may additionally or alternatively verify that the second media player device is authorized to play the particular media content.

At block 508, the one or more remote media servers may optionally send an indication that the second media player device is authorized to play the particular media content to the second media player device based on the verification. Additionally or alternatively, one remote media server may send an indication that the second media player device is authorized to play the particular media content to a second remote media server (e.g., the media authentication server 110 may send an indication of authorization to the media content server 108).

In some examples, if the second media player device or a user of the second media player device is not authorized to play the particular media content, the one or more remote media servers may send an indication to the first media player device or to the second media player device indicating the lack of authorization. In some instances, based on the indication of the lack of authorization, the first media player device or the second media player device may display a notification indicating the lack of authorization. The notification may include an indication of whether it is possible for the user to upgrade or otherwise change settings so that the second media player device or the user of the second media player device may be authorized to play the particular media content. For instance, a parental control setting associated with the second media player device or associated with a user of the second media player device may need to be changed so that the second media player device may play the particular media content from the first media player device. As another example, a media content subscription associated with the second media player device or associated with an account of a user of the second media player device may need to be upgraded so that the particular media content may be accessed (e.g., the second media player device or a user of the second media player device does not currently subscribe to a particular channel or service associated with the particular media content). In any case, once the user of the second media player device makes changes or upgrades, the second media player device may be authorized to play the particular media content.

At block 510, based on the authorization, the one or more remote media servers may send the particular media content to the second media player device. For instance, in some examples, the media content server 108 may send the particular media content to the second media player device based on receiving the indication of authorization received from the media authentication server 110.

Figure 6:
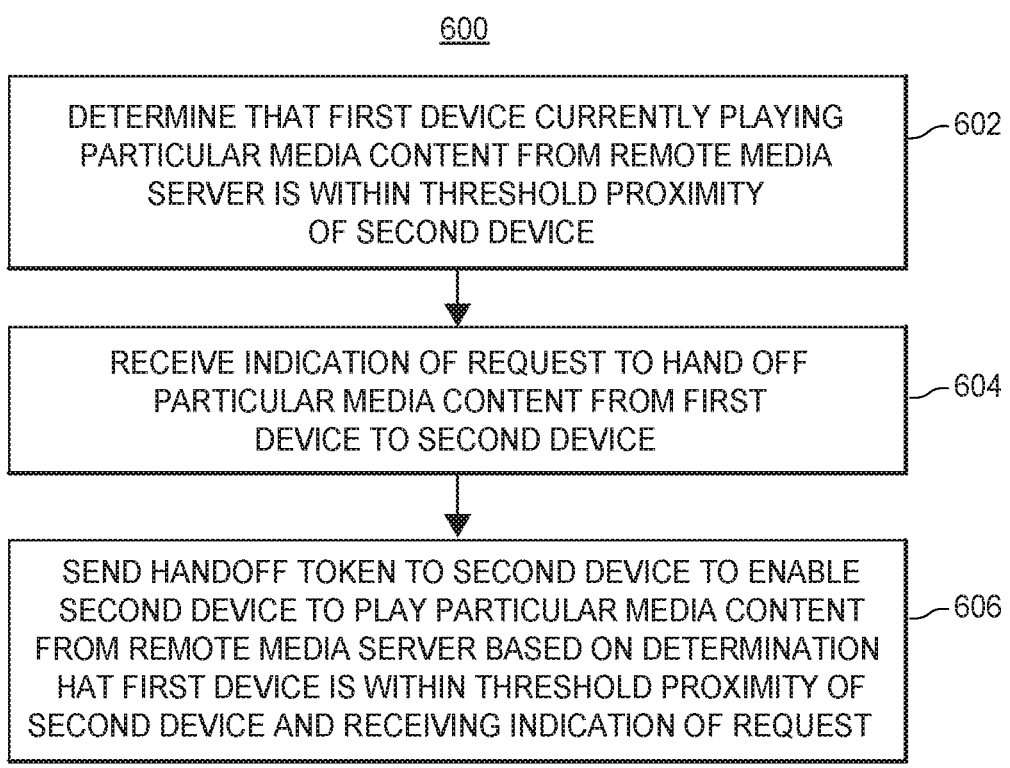
FIG. 6 illustrates a flow diagram of an example method of a display device receiving a request to hand off particular media content to a proximate display device and sending a handoff token enabling the proximate display device to play the particular media content in response to the request, in accordance with some embodiments.

FIG. 6 illustrates a flow diagram of an example method 600 of a display device receiving a request to hand off particular media content to a proximate display device and sending a handoff token enabling the proximate display device to play the particular media content in response to the request, in accordance with some embodiments. One or more steps of the method 600 may be implemented as a set of instructions stored on a computer-readable memory 118A, 118B, 124, and/or 130 and executable on one or more processors 116A, 116B, 122, and/or 128.

At block 602, a first media player device (e.g., media player device 102A) currently playing particular media content from a remote media server (e.g., media content server 108) may determine that a second media player device (e.g., media player device 102B) is within a threshold proximity of the first media player device. In some examples, the second media player device may determine that the first media player device is within a threshold proximity of the second media player device. In any case, either or both of the first media player device and the second media player device may determine that the two devices are within a threshold proximity of one another.

For example, determining that the two device are within a threshold proximity of one another may include the first media player device receiving a short-range signal from the second media player device, and/or the second media player device receiving a short-range signal from the first media player device.

At block 604, the first media player device may receive an indication of a request to hand off the particular media content to the second media player device.

In some examples, the request may originate from a user of the first media player device. For instance, in some examples, if the first media player device is a mobile device, the user may move or touch the first media player device in a specific way to request the handoff of the particular media content to the second media player device. For example, the user may perform a specific gesture while holding the first media player device to indicate that he or she is requesting the handoff of the particular media content, and the first media player device may receive the indication of the request based on the motion sensor of the first media player device detecting a motion of the first media player device indicative of the gesture.

Furthermore, in some examples, receiving the indication of the request from the user of the first media player device to hand off the particular media content from the first media player device to the second media player device may include determining that the user of the first media player device has tapped or otherwise brought the first media player device very close to the second media player device, e.g., based on the first media player device receiving a low-power short-range signal from the second media player device. For instance, the low-power short-range signal may be generated by the second media player device by reducing the power supplied to a short-range signal transmitter, i.e., such that the low-power short-range signal will only be received by the first media player device when the two media player devices are close enough to be touching one another.

Moreover, in some examples, the first media player device may receive a request for handoff of the particular media content from a user of the first media player device via a user interface of the first media player device. For example, upon determining that the second media player device is within the threshold proximity of the first media player device, the first media player device may generate a notification indicating that the first media player device is within the threshold proximity of the second media player device.

The first media player device may present the notification via a user interface display, and the notification may include an option selectable by the user of the first media player device to hand off the particular media content from the first media player device to the second media player device. In some examples, a user interface of the first media player device may be configured to receive a selection from the user as to whether the particular media content from the first media player device should be handed off to the second media player device, or vice versa (e.g., whether particular media content from the second media player device should be handed off to the first media player device). For instance, the user may swipe in one direction to indicate that the user is requesting a handoff of content from the first media player device to the second media player device, and in an opposite direction to indicate that the user is requesting a handoff of content from the second media player device to the first media player device.

Furthermore, in some examples, the first media player device may determine that there are multiple other media player devices within the threshold proximity of the second media player device, and may a user interface of the first media player device may generate a notification including an indication of each of the other media player devices (e.g., "Living Room TV", "Alice's Smart Phone", "Bob's Smart Phone," "Bob's Tablet", etc.), including an option for the user to select one or more of other media player devices to be handed off content from the first media player device. Moreover, in some examples, a user interface of the first media player device may be configured to receive a selection from the user as to whether the particular media content is to be redirected (e.g., playing the content is ceased by the first media player device when it begins to be played on the second media player device) or duplicated (e.g., the particular media content is played on multiple devices simultaneously).

Additionally, in some examples, the request may originate from the second media player device (or a user of the second media player device). That is, the second media player device may receive an indication of a request for content to be handed off from the first media player device to the second media player device (e.g., from a user of the second media player device), and may send an indication of the request to the first media player device, which may receive the request at block 604. For instance, the second media player device may receive a user's request in ways similar to the ways discussed above in which the first media player device may receive the indication of a user's request (e.g., based on a gesture performed by a user of the second media player device, via a user interface, by the two devices being tapped together or otherwise moved very close to one another, etc.), and may send an indication of the request to the first media player device.

At block 606, the first media player device may send a handoff token to the second media player device to enable the second media player device to play the particular media content from the remote media server, e.g., based on both determining that the first media player device is within the threshold proximity of the second media player device and receiving the indication of the request. For instance, the first media player device may send the handoff token to the second media player device via a short-range signal.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs for handing off media content between proximate display devices. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A method for handing off media content between proximate display devices, comprising:
   determining, by one or more of a first media player device currently playing a particular media content from a remote media server and a second media player device, that the first media player device is within a threshold proximity of the second media player device;
   receiving, by the first media player device, an indication of a request to hand off the particular media content from the first media player device to the second media player device; and
   sending, by the first media player device, responsive to the determination that the first media player device is within the threshold proximity of the second media player device and receiving the indication of the request, a handoff token to the second media player device to enable the second media player device to play the particular media content from the remote media server, wherein the handoff token comprises at least a first time point within the media content and a time at which the handoff token was sent, such that the second media player device is caused to play the media content from a second time point within the media content that is offset from the first time point by an amount of time that has elapsed since the time at which the handoff token was sent.

2. The method of claim 1, wherein determining the first media player device is within the threshold proximity of the second media player device is based on one or more of: the first media player device receiving a short-range signal from the second media player device or the second media player device receiving a short range signal from the first media player device.

3. The method of claim 1, wherein receiving the indication of the request, by the first media player device, to hand off the particular media content from the first media player device to the second media player device includes:
   determining that a user of the first media player device has tapped the first media player device to the second media player device based on the first media player device receiving a low-power short range signal from the second media player device.

4. The method of claim 3, wherein the low-power short-range signal is generated by reducing the power supplied to a short range signal transmitter.

5. The method of claim 1, wherein receiving the indication of the request, by the user of the first media player device, includes:
   determining, by the first media player device, that a user of the first media player device has performed a particular gesture while holding the first media player device based on data captured by a motion sensor of the first media player device.

6. The method of claim 1, further comprising:
   generating, by the first media player device, responsive to the determination that the first media player device is within the threshold proximity of the second media player device, a notification indicating that the first media player device is within the threshold proximity of the second media player device and including an option selectable by a user of the first media player device to hand off the particular media content from the first media player device to the second media player device; and
   presenting, by the first media player device, the notification via a user interface display of the first media player device; and
   wherein receiving the indication of the request, by first media player device, to hand off the particular media content from the first media player device to the second media player device includes receiving an indication of a selection of the option to hand off the particular media content from the first media player device to the second media player device by the user.

7. The method of claim 6, wherein the second media player device is one of a plurality of media player devices within the threshold proximity of the first media player device, and wherein receiving the indication of the request from the user of the first media player device to hand off the particular media content from the first media player device to the second media player device includes receiving an indication of a selection of the second media player device from among the plurality of media player devices within the threshold proximity of the first media player device.

8. The method of claim 1, wherein sending the handoff token to the second media player device to enable the second media player device to play the particular media content from the remote media server includes sending the handoff token to the second media player device via a short-range signal.

9. The method of claim 1, further comprising:
   receiving, by the second media player device, the indication of the request to hand off the particular media content from the first media player device to the second media player device; and
   sending, by the second media player device, to the first media player device, the indication of the request to hand off the particular media content from the first media player device to the second media player device.

10. The method of claim 9, wherein receiving the indication of the request, by the second media player device, to hand off the particular media content from the first media player device to the second media player device includes:
    determining that a user of the second media player device has tapped the second media player device to the first media player device based on the second media player device receiving a low-power short range signal from the first media player device.

11. The method of claim 9, wherein receiving the indication of the request by the second media player device includes:
    determining, by the second media player device, that a user of the second media player device has performed a particular gesture while holding the second media player device based on data captured by a motion sensor of the second media player device.

12. The method of claim 9, further comprising:
    generating, by the second media player device, responsive to the determination that the first media player device is within the threshold proximity of the second media player device, a notification indicating that the first media player device is within the threshold proximity of the second media player device and including an option selectable by a user of the second media player device to hand off the particular media content from the first media player device to the second media player device;
    presenting, by the second media player device, the notification via a user interface display of the second media player device; and wherein receiving the indication of the request, by the second media player device, to hand off the particular media content from the first media player device to the second media player device includes receiving an indication of a selection of the option to hand off the particular media content from the first media player device to the second media player device by the user.

13. The method of claim 1, wherein the threshold proximity is selected by a user of the first media player device or a user of the second media player device.

14. A system for handing off media content between proximate display devices, the system comprising:
a remote media server;
a first media player device configured to play media content; and
a second media player device configured to play media content;
wherein the first media player device comprises:
one or more processors; and
a non-transitory program memory communicatively coupled to the one or more processors and storing executable instructions that, when executed by the one or more processors, cause the processors to:
determine that the first media player device is within a threshold proximity of the second media player device;
receive an indication of a request to hand off the particular media content from the first media player device to the second media player device; and
send, responsive to the determination that the first media player device is within the threshold proximity of the second media player device and receiving the indication of the request, a handoff token to the second media player device to enable the second media player device to play the particular media content from the remote media server, wherein the handoff token comprises at least a first time point within the media content and a time at which the handoff token was sent, such that the second media player device is caused to play the media content from a second time point within the media content that is offset from the first time point by an amount of time that has elapsed since the time at which the handoff token was sent.

15. The system of claim 14, wherein the instructions cause the one or more processors to determine that the first media player device is within the threshold proximity of the second media player device based on one or more of: the first media player device receiving a short-range signal from the second media player device or the second media player device receiving a short range signal from the first media player device.

16. The system of claim 14, wherein the instructions cause the one or more processors to receive the indication of the request to hand off the particular media content from the first media player device to the second media player device by:
determining that a user of the first media player device has tapped the first media player device to the second media player device based on the first media player device receiving a low-power short range signal from the second media player device.

17. A non-transitory computer readable storage medium storing computer-readable instructions for handing off media content between proximate display devices, that, when executed by one or more processors, cause the one or more processors to:
determine that a first media player device is within a threshold proximity of a second media player device;
receive an indication of a request to hand off the particular media content from the first media player device to the second media player device; and
send, responsive to the determination that the first media player device is within the threshold proximity of the second media player device and receiving the indication of the request, a handoff token to the second media player device to enable the second media player device to play the particular media content from the remote media server, wherein the handoff token comprises at least a first time point within the media content and a time at which the handoff token was sent, such that the second media player device is caused to play the media content from a second time point within the media content that is offset from the first time point by an amount of time that has elapsed since the time at which the handoff token was sent.

18. The non-transitory computer readable storage medium of claim 17, wherein the instructions cause the one or more processors to determine that the first media player device is within the threshold proximity of the second media player device based on one or more of: the first media player device receiving a short-range signal from the second media player device or the second media player device receiving a short range signal from the first media player device.

19. The non-transitory computer readable storage medium of claim 17, wherein the instructions cause the one or more processors to receive the indication of the request to hand off the particular media content from the first media player device to the second media player device by:
determining that a user of the first media player device has tapped the first media player device to the second media player device based on the first media player device receiving a low-power short range signal from the second media player device.

20. The non-transitory computer readable storage medium of claim 17, wherein the instructions cause the one or more processors to receive the indication of the request to hand off the particular media content from the first media player device to the second media player device by:
determining that a user of the first media player device has performed a particular gesture while holding the first media player device based on data captured by a motion sensor of the first media player device.

* * * * *